I. E. PALMER.
RUNNING GEAR FOR VEHICLES.
APPLICATION FILED FEB. 17, 1908.
938,782.
Patented Nov. 2, 1909.
6 SHEETS—SHEET 2.
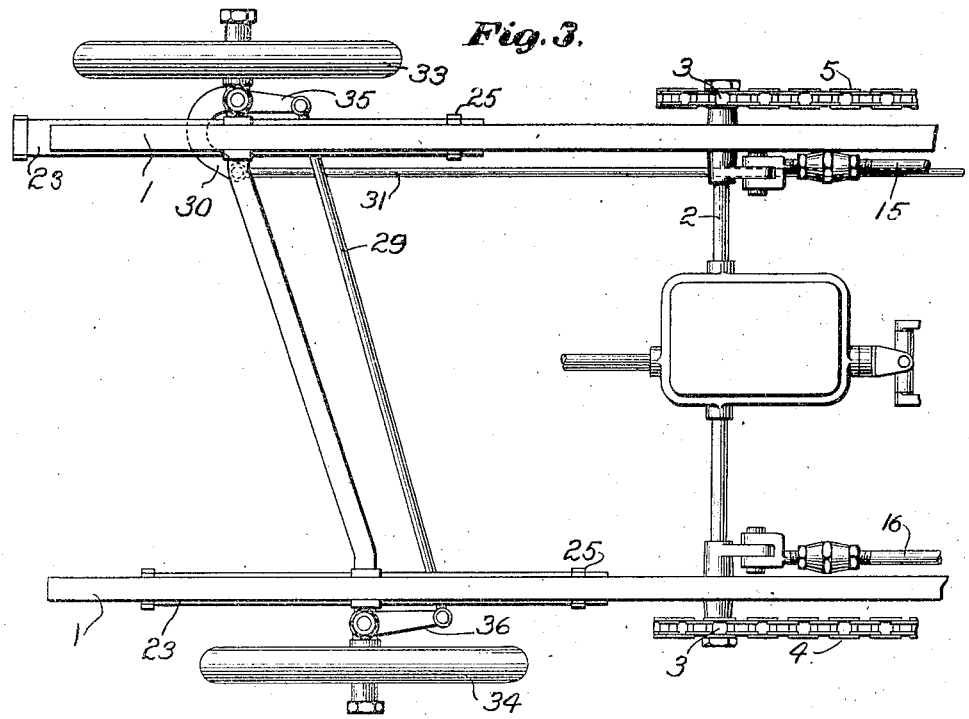
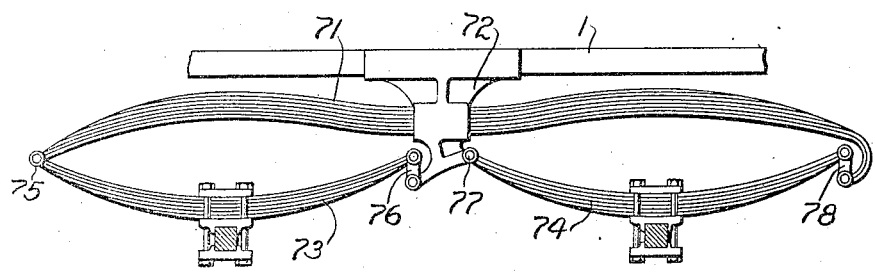
Witnesses:
Edwin T. Luce
Robert H. Kammler
Inventor:
Isaac E. Palmer,
by Emery and Booth
Attys.

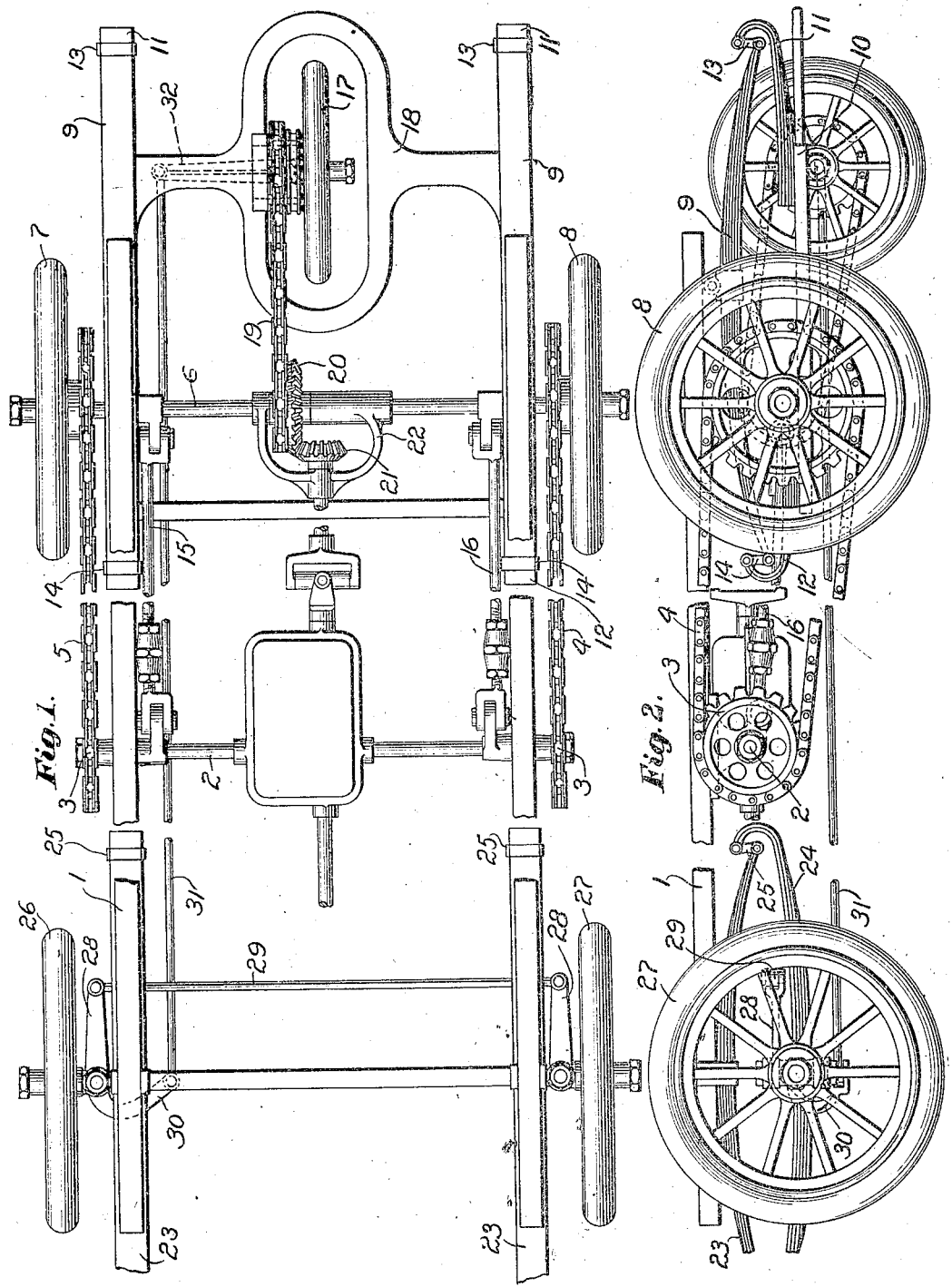

I. E. PALMER.
RUNNING GEAR FOR VEHICLES.
APPLICATION FILED FEB. 17, 1908.

938,782.

Patented Nov. 2, 1909.
6 SHEETS—SHEET 3.

Witnesses:
Edwin P. Luce
Robert H. Kammler

Inventor:
Isaac E. Palmer,
by Emery and Booth
Attys

I. E. PALMER.
RUNNING GEAR FOR VEHICLES.
APPLICATION FILED FEB. 17, 1908.
938,782.
Patented Nov. 2, 1909.
6 SHEETS—SHEET 4.
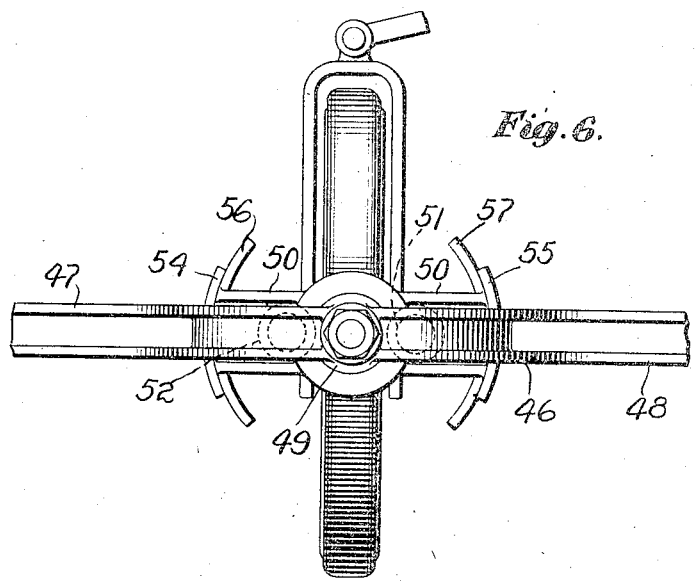
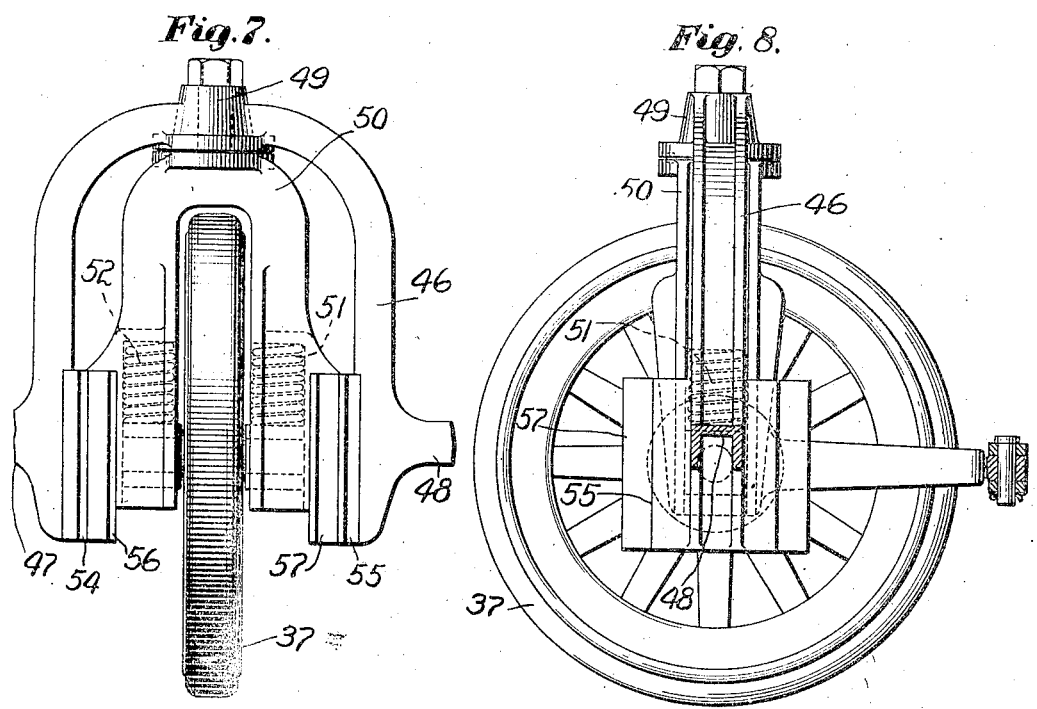
Witnesses:
Edwin S. Luer
Robert H. Kammle
Inventor:
Isaac E. Palmer,
by Emery and Booth
Att'ys.

I. E. PALMER.
RUNNING GEAR FOR VEHICLES.
APPLICATION FILED FEB. 17, 1908.

938,782.

Patented Nov. 2, 1909.
6 SHEETS—SHEET 5.

Witnesses:
Edwin T. Luck
Robert H. Kammler

Inventor:
Isaac E. Palmer,
by Emery and Booth
Attys.

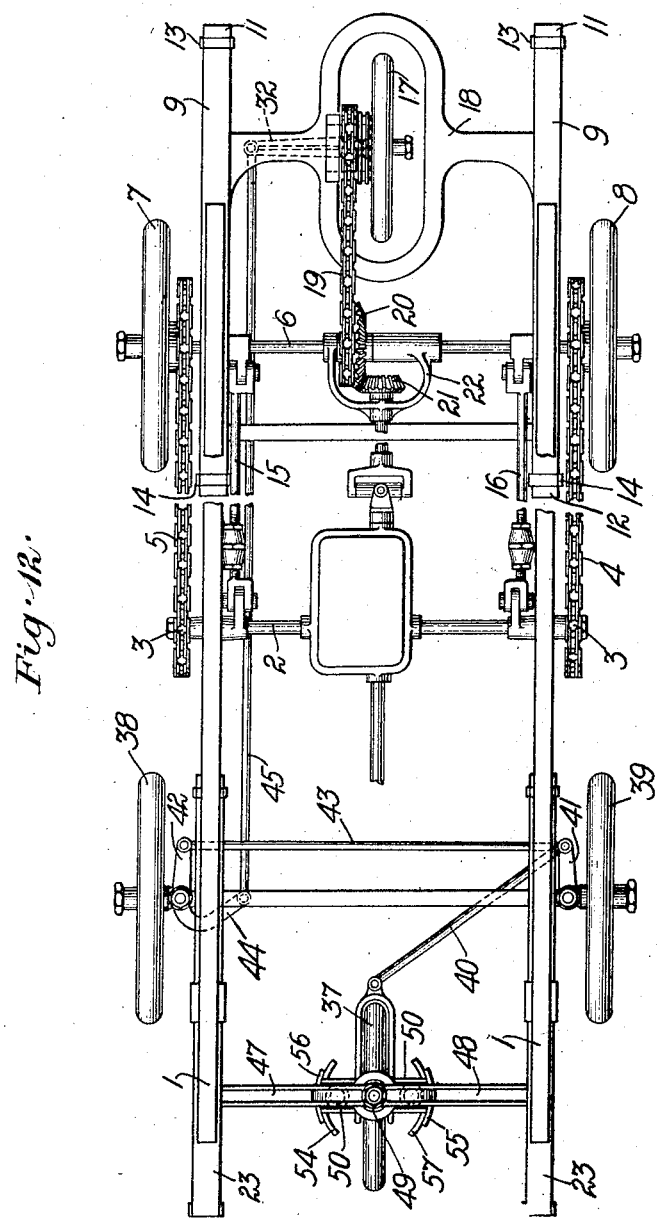

UNITED STATES PATENT OFFICE.

ISAAC E. PALMER, OF MIDDLETOWN, CONNECTICUT.

RUNNING-GEAR FOR VEHICLES.

938,782.

Specification of Letters Patent.   Patented Nov. 2, 1909.

Application filed February 17, 1908. Serial No. 416,170.

*To all whom it may concern:*

Be it known that I, ISAAC E. PALMER, a citizen of the United States, residing at Middletown, in the county of Middlesex and State of Connecticut, have invented an Improvement in Running-Gear for Vehicles, of which the following description, in connection with the accompanying drawings, is a specification, like numerals on the drawings representing like parts.

This invention relates to running gear for trackless, power driven vehicles, and it has more particularly for its objects to provide a construction whereby if desired the use of pneumatic tires may be avoided, to provide increased traction, to provide more extensive wheel support so as to reduce the weight upon individual wheels, to reduce the liability of skidding, to provide trucks or semi-trucks, preferably spring connected to the body of the vehicle, and to provide if desired compensating devices for the various arrangements of wheels.

In order that the principles of the invention may be clearly understood, I have in the accompanying drawings disclosed certain types or embodiments of my invention, wherein—

Figure 4:
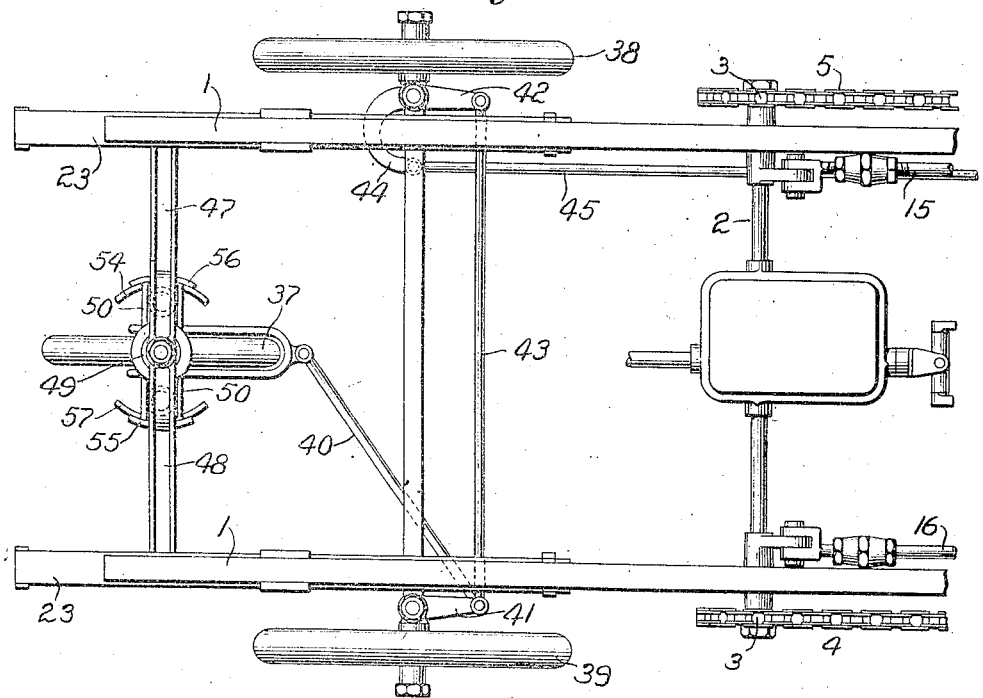
Figure 5:
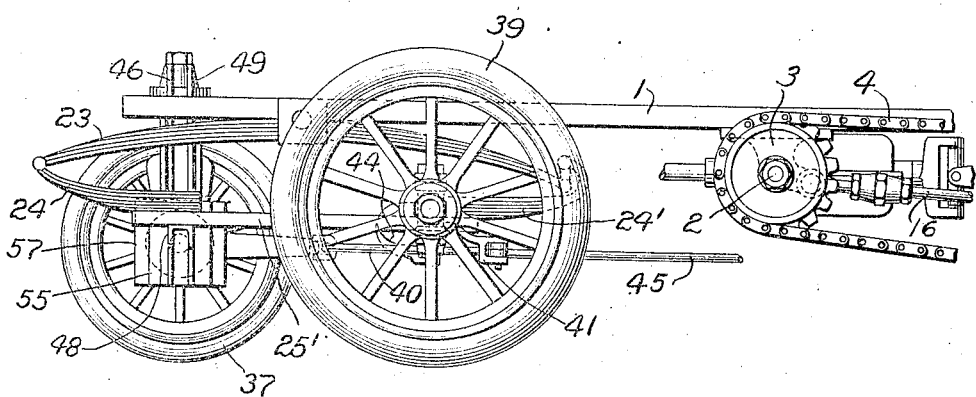
Figure 9:
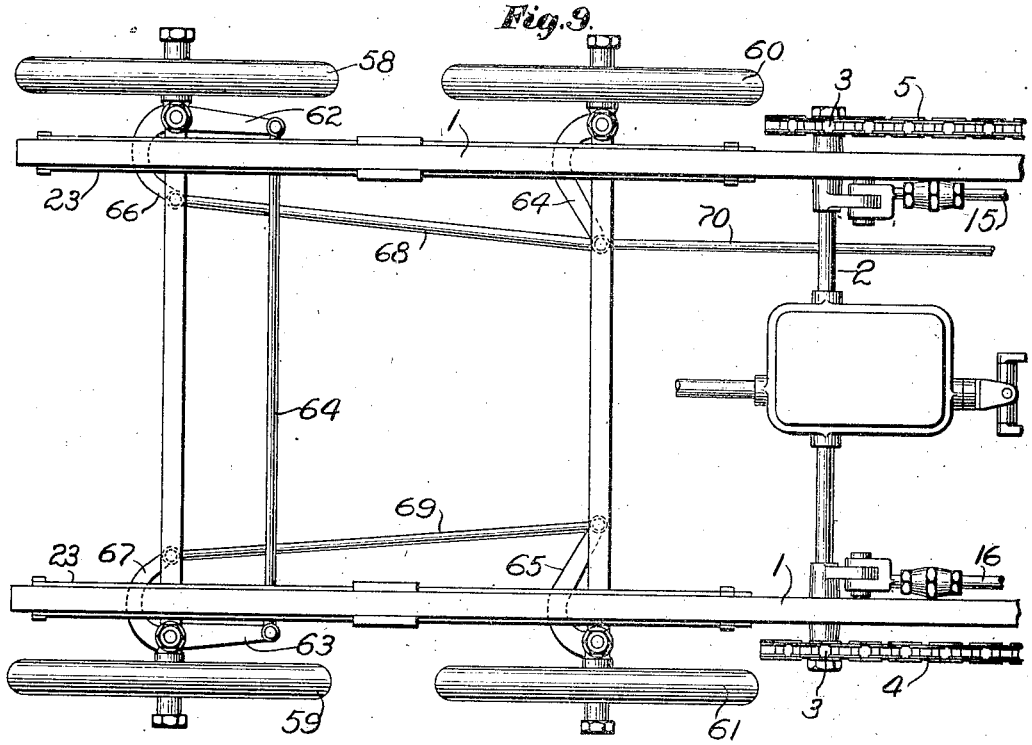
Figure 10:
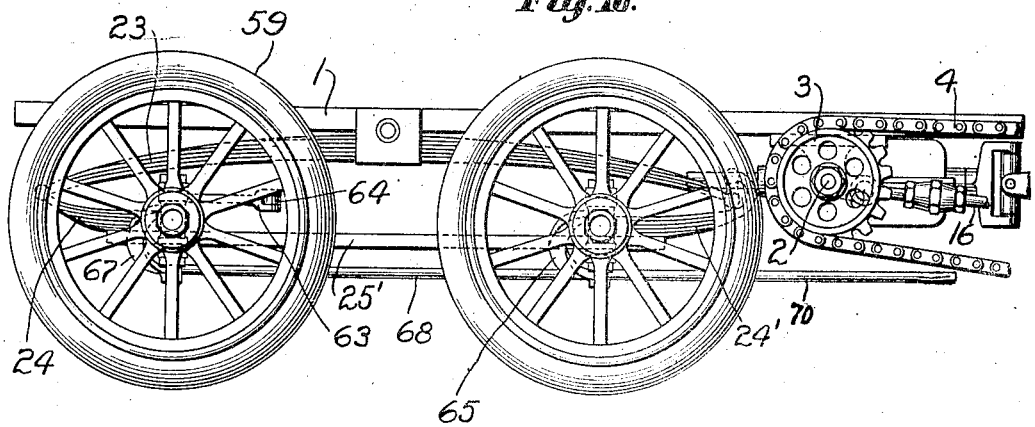

Figure 1 is a plan view of a portion of the body of a trackless power driven vehicle embodying one form of my invention; Fig. 2 is a side elevation of that form of my invention shown in Fig. 1; Fig. 3 is a plan view of the forward portion of a trackless, power driven vehicle similar to Fig. 1 but representing the forward wheels as out of transverse alinement; Fig. 4 is a plan view of a form of my invention wherein three forward wheels are provided; Fig. 5 is a side elevation of the construction shown in Fig. 4; Fig. 6 is a plan view upon an enlarged scale of the means for mounting the leading forward wheel represented in Fig. 4; Fig. 7 is a front view of the construction represented in Fig. 6; Fig. 8 is a side elevation partially in section of such construction; Fig. 9 is a plan view of the forward portion of a trackless, power driven vehicle embodying my invention and wherein four forward wheels are provided; Fig. 10 is a side elevation of the construction represented in Fig. 9; Fig. 11 is a side elevation, partly in section, of a form of spring support that may be employed with a forward or rear truck; Fig. 12 is a plan view of a trackless, power driven vehicle provided with the preferred arrangement of front and rear wheels.

My present invention contemplates a trackless, power driven vehicle wherein the rear of the vehicle is provided with a truck movably connected thereto and whereon are mounted more than two wheels, one of said wheels being arranged so as not to track with the others, the forward portion of the body being supported by suitable wheels preferably mounted upon a truck movably connected to the said body. In the several forms of my invention, I have represented two, three and four forward wheels mounted upon a truck, although it is apparent that my invention may be embodied in other forms than that herein illustrated.

Referring specifically to that form of the invention typified in Figs. 1, 2 and 12, the body frame is represented at 1 and is shown as broken away for convenience of illustration. Suitably supported upon said body frame is a main driving shaft 2 receiving power in any suitable manner and adapted by suitable gearing, as sprocket, spur or the like, to convey power to the rear wheels. Herein, I have represented sprocket wheels 3 mounted upon said shaft and sprocket chains 4 and 5 for driving the rear axle 6 whereon are suitably mounted wheels 7 and 8. The said axle 6 and wheels 7 and 8 are mounted upon a rear truck of any suitable type movably connected in any suitable manner to the body of the vehicle. As shown more clearly in Fig. 2, the said truck comprises side springs 9, each of which is suitably connected to the under side of the body of the vehicle, coöperating supporting means being provided in connection with each spring 9. Herein, for the purpose, I have represented longitudinal members 10 to which are suitably connected springs 11 and 12, the ends whereof are pivotally connected by links 13 and 14 to the spring 9. In this manner, the truck is movably and resiliently connected to the main body of the vehicle so that the truck may absorb the shocks and jars received from the road bed, thus preventing the transmission thereof to the body of the vehicle. While either end of the truck may be tilted in a vertical plane and while the members of the truck as a whole or at either side may be compressed to absorb shocks and jars, preferably the truck is held from lateral deflection with respect to the longitudinal axis of the vehicle. Herein, for the purpose, I provide radius rods 15 and 16 pivotally connected to the shaft 2 and axle 6 and preferably having means to adjust the length thereof.

In order to provide increased traction, to provide more extensive wheel support and to reduce the liability of skidding, I provide more than two wheels for the rear truck. In the present form of my invention, I have shown the use of a third wheel 17 mounted intermediate the paths of the other wheels and herein supported in a yoke 18 suitably connected to the side members of the truck. The said wheel 17 is preferably driven as from the axle 6 by sprocket gearing 19, the axle 6 being for this purpose provided with a combined sprocket and beveled gear 20 receiving power from a beveled gear 21 mounted in a bracket 22 upon the axle 6 and receiving motion in any suitable manner. It is to be understood, however, that the wheel 17 may be driven in any convenient or suitable manner. The said wheel is mounted for lateral deflection with respect to the longitudinal axis of the vehicle, and to this end may be provided with any suitable connections permitting the driving and lateral deflection thereof, as, for example, any of the connections employed for that purpose in my application Serial No. 402,594, filed Nov. 20, 1907.

The forward truck which I preferably employ to support the forward wheels may be of any suitable construction. Herein I have represented in said figures side upper springs 23 suitably connected to the under side of the body of the vehicle and side under springs 24, one end of each of which, and herein the rear end, is pivotally connected by a link 25 to the upper spring 23. As shown in Figs. 1 and 2, suitably mounted upon said truck are the forward wheels 26 and 27 adapted to be laterally deflected with respect to the longitudinal axis of the vehicle in any suitable manner, being connected with the steering apparatus in a manner not herein illustrated. In order that the said forward wheels 26 may receive simultaneous deflection, I have provided each of them with a lever 28, said levers being connected by a link 29. In the present type of my invention, I have employed means whereby when the wheels 26 and 27 are laterally deflected in one direction, the rear wheel 17 may be laterally deflected in the opposite direction. While any suitable means may be employed for the purpose, herein I have operatively connected to the lever 28 of the wheel 26 a lever arm 30, to which is pivotally connected the forward end of a longitudinal rod 31, the rear end whereof is similarly connected to a steering lever 32 suitably connected to the said wheel 17 laterally to deflect the same and in the opposite direction, said steering lever 32 being of proper proportional length to effect the desired deflection.

In Figs. 1 and 2 I have represented the front wheels 26 and 27 as in transverse alinement. If desired, however, the front wheels may be arranged out of transverse alinement. In Fig. 3, I have represented the front wheel 33 disposed somewhat in advance of the wheel 34, such disposition of the wheels being intended to distribute between them and to lessen the effect of the shocks and jars of traveling. When the wheels are arranged out of transverse alinement, I provide compensating connections whereby a differential deflecting movement is imparted to the wheels during the turning operation. To that end, the lever arm 35 connected with the wheel 33 is shorter than the lever arm 36 connected with the wheel 34, whereby there may be imparted to the leading wheel 33 a greater angular deflection than is imparted to the wheel 34, it being apparent that the leading wheel 33 must be deflected through the same arc as the wheel 34, but in a shorter space of time, since the two wheels must complete the turn simultaneously. It is apparent that in the type of my invention represented in Fig. 3 the rear wheels may be mounted and driven in any suitable manner, as for example, in the manner represented in Fig. 1.

In the type of my invention represented in Figs. 4, 5 and 12, I employ three wheels 37, 38 and 39 mounted upon a forward truck which may be of the general type illustrated in Figs. 1 and 2. I have, however, indicated the truck as here formed of upper spring members 23 and lower partial spring members 24, 24' suitably connected to longitudinal members 25', as most clearly represented in Fig. 5. The wheel 37 is herein represented as arranged intermediate the paths of the wheels 38 and 39. Steering or lateral deflecting movement may be imparted to the wheel 37 in any suitable manner, not herein necessary to illustrate. Preferably, each of the said three wheels is mounted for lateral deflection, and to that end I have represented the support for the wheel 37 as provided with a link 40 connected to the deflecting lever 41 of the wheel 39. The wheel 38 is provided with a similar deflecting lever 42, said levers 41 and 42 being connected by a link 43. If desired, a lever arm 44 and link 45 may be provided for the deflection of the intermediate rear wheel, if such be employed. The rear portion of the truck may if desired be of the general construction illustrated in Figs. 1 and 2.

In Figs. 6, 7 and 8, I have represented more in detail and upon a larger scale one manner of mounting the intermediate leading wheel 37. Herein, for the purpose, I have provided a yoke 46 having side members 47 and 48, preferably rigidly connected with the side members of the forward truck. Pivotally mounted within the outer yoke 46 as upon a vertical pin 49 is an inner yoke 50 which may be laterally deflected from the steering gear and which receives in bearings the wheel 37. Herein I have represented coil springs 51 and 52 received within the yoke 50 above the bearings of said wheel to absorb a portion of the shocks and jars. Any suitable means may be provided to guide the deflecting movement of the inner yoke 50. Herein, for the purpose, I have represented the outer yoke 46 as provided with opposite arc shaped plates 54 and 55 providing guiding ways for similar but preferably longer arc shaped plates 56 and 57 provided upon the lower portion of the inner yoke 50.

In that form of my invention wherein three wheels are mounted upon the forward truck, one being intermediate the others, preferably the outer wheels are arranged in transverse alinement, though I may arrange them out of transverse alinement and provide suitable compensating or differential connections in the manner previously referred to.

In Figs. 9 and 10, I have represented a form of my invention wherein the forward truck is provided with four wheels 58, 59, 60 and 61 arranged in pairs and herein represented as in transverse alinement, it being apparent, however, that either or both pairs may be arranged out of transverse alinement, in which case suitable differential compensating connections should be provided for the deflecting movement. The levers 62 and 63 for laterally deflecting the front wheels 58 and 59 are of shorter length than the corresponding levers 64 and 65 for deflecting the wheels 60 and 61, in order that the leading wheels 58 and 59 may be deflected at a somewhat greater angle than the wheels 60 and 61. I have herein represented the lever arm 62 and 63 as connected for simultaneous operation by a link 64, the lever arms 62 and 63 being operatively connected to or formed with lever arms 66 and 67 connected by links 68 and 69 to the levers 64 and 65 for the wheels 60 and 61. If desired, a link 70 may be pivotally connected to one of the links 68 or 69, or the levers to which they are attached, and herein to the link 68, the other link 70 being preferably operatively connected to the intermediate rear wheel in a manner previously described.

In Fig. 11, I have represented a form of spring support for a forward or rear truck. Herein, is represented an upper spring or series of springs 71 connected in any suitable manner to the body 1 or to a bracket 72 secured thereto. To the ends of the spring or springs 71 are connected two shorter springs or sets of springs 73, 74. The springs 73 are directly and pivotally connected at one end as 75 to the spring 71, the opposite end of the spring or springs 73 being pivotally connected, as by a link 76, to the bracket 72. The adjacent or inner end of the spring or springs 74 is directly and pivotally connected, as at 77, with the bracket 72, the other or outer end of the spring 74 being pivotally connected by a link 78 with the outer end of the upper or main spring 71. As represented in said figure, one or more of the wheels of the vehicle are connected to each of the springs 73 and 74. The said springs yield when an obstacle or unevenness in the road is encountered and rock the links 76 and 78. Excessive jar is taken up partly by the springs 73 and 74 and in part by the main or upper spring 71, thus relieving the body of the vehicle from substantially all shock or jar.

Having thus described one type or embodiment of my invention, I desire it to be understood that although specific terms are employed, they are used in a generic and descriptive sense and not for purposes of limitation, the scope of the invention being set forth in the following claims:

1. Running gear for trackless power driven vehicles comprising a truck movable with respect to the body frame and connected to the rear thereof, three wheels mounted upon said truck, two of said wheels being at opposite sides of said vehicle one of said wheels being arranged between the sides of the vehicle so as not to track with the said other wheels of said truck, and means to drive a plurality of wheels of said truck including said non-tracking wheel.

2. Running gear for trackless, power driven vehicles comprising a truck movable with respect to the body frame and connected thereto, three driven wheels mounted upon said truck, two of said wheels being in transverse alinement, and the third wheel not tracking with said transversely alined wheels, and a plurality of wheels coöperating with said first mentioned wheels to support the vehicle.

3. Running gear for trackless, power driven vehicles comprising a truck movable with respect to the body frame and connected to the rear thereof, an odd number of wheels mounted upon said truck, one at least of said wheels being intermediate the paths of the other wheels and laterally deflected with respect to the longitudinal axis of the vehicle, two or more forward wheels, and connecting means for positively deflecting said forward wheels and said intermediate rear wheel.

4. Running gear for trackless, power driven vehicles comprising a truck movable with respect to the body frame and connected to the rear thereof, an odd number of wheels mounted upon said truck, one at least of said wheels being intermediate the paths of the other wheels and to the rear thereof, said intermediate wheel being positively driven, two or more forward wheels, and connecting means for positively deflecting said forward wheels and said intermediate rear wheel.

5. Running gear for trackless, power driven vehicles comprising a truck movable with respect to the body frame and connected to the rear thereof, an odd number of wheels mounted upon said truck, one at least of said wheels being intermediate the paths of the other wheels, two at least of said odd number of wheels, including said intermediate wheel being driven, three front wheels, and means for positively deflecting said intermediate rear wheel.

6. Running gear for trackless, power driven vehicles comprising a truck movable with respect to the body frame and connected to the rear thereof, said truck having an axle, a pair of driven wheels mounted thereon, an intermediate wheel also mounted upon said truck, means for driving said intermediate wheel, and three front wheels connected to the vehicle, one of said front wheels being intermediate the paths of the other two front wheels.

7. Running gear for trackless, power driven vehicles including among its elements a truck movable with respect to the body frame and connected to the front portion thereof, an outer yoke connected with the truck and intermediate the sides thereof, an inner yoke mounted within the outer yoke for lateral deflection with respect to said outer yoke, a wheel mounted in said inner yoke, and a pair of side wheels mounted upon said truck and laterally deflected with respect to the truck.

8. Running gear for trackless, power driven vehicles including among its elements a track movable with respect to the body frame and connected to the front portion thereof, an outer yoke rigidly connected with said truck and intermediate the sides thereof, an inner yoke mounted for lateral deflection with respect to said outer yoke, and a wheel yieldingly mounted in said inner yoke.

9. Running gear for trackless, power driven vehicles including among its elements a truck movable with respect to the body frame and connected to the front portion thereof, a yoke intermediate the sides of the truck and connected thereto, an inner yoke pivoted to the first mentioned yoke to be laterally deflected with respect thereto, and a wheel mounted in the said inner yoke, and yieldingly supported with respect to said yokes.

10. Running gear for trackless, power driven vehicles including among its elements a truck movable with respect to the body frame and connected to the front portion thereof, a yoke intermediate the sides of the truck and connected thereto, an inner yoke pivoted to the first mentioned yoke to be laterally deflected with respect thereto, a wheel mounted in the inner yoke, and means to guide the deflecting movements of said inner yoke and wheel, said wheel being yieldingly supported.

11. Running gear for trackless, power driven vehicles including among its elements a truck movable with respect to the body frame and connected to the front portion thereof, three wheels mounted upon said truck, one of them being intermediate the paths of the others, said wheels being mounted to be deflected laterally from the longitudinal axis of the vehicle, and differential connections to compensate the deflecting movement of the said intermediate wheel and the said other wheels with respect to each other.

12. Running gear for trackless, power driven vehicles including among its elements a truck movable with respect to the body frame and connected to the front portion thereof, three wheels mounted upon said truck, two of said wheels being in transverse alinement upon an axle and laterally deflectable relative to said axle and the other wheel being intermediate their paths, and deflecting means for the said wheels including connections for positively deflecting said intermediate wheel with respect to said transversely alined wheels.

13. Running gear for trackless, power driven vehicles including among its elements a truck movable with respect to the body frame and connected to the rear portion thereof, three wheels mounted upon said truck, one of said wheels being intermediate the paths of the others, means to drive each of said wheels, and means laterally to deflect said intermediate wheel with respect to the longitudinal axis of the vehicle.

14. Running gear for trackless, power driven vehicles including among its elements a truck movable with respect to the body frame and connected to the front thereof, two or more wheels mounted upon said truck and adapted to be laterally deflected with respect to the longitudinal axis of the vehicle, a truck movable with respect to the body frame and connected to the rear portion thereof, three wheels mounted upon said rear truck, one of said wheels being intermediate the paths of the others, and mounted for lateral deflection with respect to the longitudinal axis of the vehicle, steering connections between the wheels of the forward truck and said intermediate wheel of the rear truck, and means for driving the wheels of the rear truck.

15. Running gear for trackless power driven vehicles comprising a truck movable with respect to the body frame and connected to the rear thereof, an odd number of wheels being mounted upon said truck and including driven side wheels and a driven intermediate wheel, the said intermediate wheel being to the rear of said side wheels, means positively to deflect said intermediate wheel with respect to the longitudinal axis of the vehicle and a plurality of wheels to support the front of the vehicle.

16. Running gear for trackless power driven vehicles comprising a body frame, a plurality of wheels supporting the forward portion thereof, means positively to deflect said wheels, a truck movable with respect to the body frame and connected to the rear thereof, an odd number of wheels mounted upon said truck and including side wheels and an intermediate wheel, said intermediate wheel being deflectable, and positive deflecting means connecting said front wheels and said intermediate rear wheel.

17. Running gear for trackless power driven vehicles comprising a body frame, a plurality of wheels supporting the forward portion thereof, means positively to deflect said wheels, a truck movable with respect to the body frame and connected to the rear thereof, an odd number of wheels mounted upon said truck and including side wheels and an intermediate wheel, said intermediate wheel being deflectable, and positive deflecting means connecting said front wheels and said intermediate rear wheel and including compensating connections for said intermediate rear wheel.

18. Running gear for trackless power driven vehicles comprising a body frame, a plurality of wheels supporting the forward portion thereof, means positively to deflect said wheels, a truck movable with respect to the body frame and connected to the rear thereof, three wheels mounted upon said truck, two of said wheels being drven and fixed from lateral deflection and the third wheel being intermediate the other rear wheels, and means connected with the front wheel deflecting means positively to deflect said intermediate wheel.

19. Running gear for trackless power driven vehicles comprising a body frame, a plurality of wheels supporting the forward porton thereof, means positively to deflect said wheels, a truck movable with respect to the body frame and connected to the rear thereof, three wheels mounted upon said truck, one of said wheels being intermediate the others, means to drive all of said rear wheels, and means positively to deflect said intermediate rear wheel.

20. Running gear for trackless power driven vehicles comprising among its elements a truck movable with respect to the body frame, springs connecting said truck to the front portion of the body frame, a pair of wheels connected to said truck and an intermediate wheel also connected to said truck, a deflecting support for said intermediate wheel, and means for yieldingly mounting said intermediate wheel in said support.

In testimony whereof, I have signed my name to this specification, in the presence of two subscribing witnesses.

ISAAC E. PALMER.

Witnesses:
 CHAS. M. SAUER,
 GEO. C. HAINS.